United States Patent
Dieleman et al.

(10) Patent No.: US 9,126,626 B1
(45) Date of Patent: Sep. 8, 2015

(54) APPARATUS FOR STEERING A BOOM SUPPORT VEHICLE AND METHOD OF USE

(71) Applicants: Robert Dennis Dieleman, Las Vegas, NV (US); James Robb McGhie, Henderson, NV (US)

(72) Inventors: Robert Dennis Dieleman, Las Vegas, NV (US); James Robb McGhie, Henderson, NV (US)

( * ) Notice: Subject to any disclaimer, the term of this patent is extended or adjusted under 35 U.S.C. 154(b) by 0 days.

(21) Appl. No.: 14/488,390

(22) Filed: Sep. 17, 2014

(51) Int. Cl.
*B62D 12/00* (2006.01)
*B66C 23/62* (2006.01)
*B62D 63/08* (2006.01)
*B62D 5/12* (2006.01)

(52) U.S. Cl.
CPC *B62D 12/00* (2013.01); *B62D 5/12* (2013.01); *B62D 63/08* (2013.01); *B66C 23/62* (2013.01)

(58) Field of Classification Search
CPC ........................................................ B62D 12/00

USPC .................................................. 180/418, 420
See application file for complete search history.

(56) References Cited

U.S. PATENT DOCUMENTS

| | | | | |
|---|---|---|---|---|
| 3,744,574 A | * | 7/1973 | Carley | 173/27 |
| 3,926,453 A | * | 12/1975 | Leslie | 280/81.1 |
| 4,365,685 A | * | 12/1982 | Ratsko et al. | 180/419 |
| 4,940,106 A | * | 7/1990 | Pedersen et al. | 180/420 |
| 5,427,195 A | * | 6/1995 | Paul et al. | 180/308 |
| 7,624,836 B2 | * | 12/2009 | Huang et al. | 180/423 |
| 2009/0151313 A1 | * | 6/2009 | Dillon | 56/14.6 |

* cited by examiner

*Primary Examiner* — Kevin Hurley
(74) *Attorney, Agent, or Firm* — Ted Masters

(57) ABSTRACT

Apparatus for steering a boom support vehicle includes a boom support vehicle which has a front section which is rotatably connected at a pivot to a rear section. The one side of the rear end of the front section is connected to the same side of the front end of the rear section by a variable length mechanism. Steering is effected by changing the length of the variable length mechanism thereby causing the rear section to rotate about the pivot with respect to the front section.

14 Claims, 9 Drawing Sheets

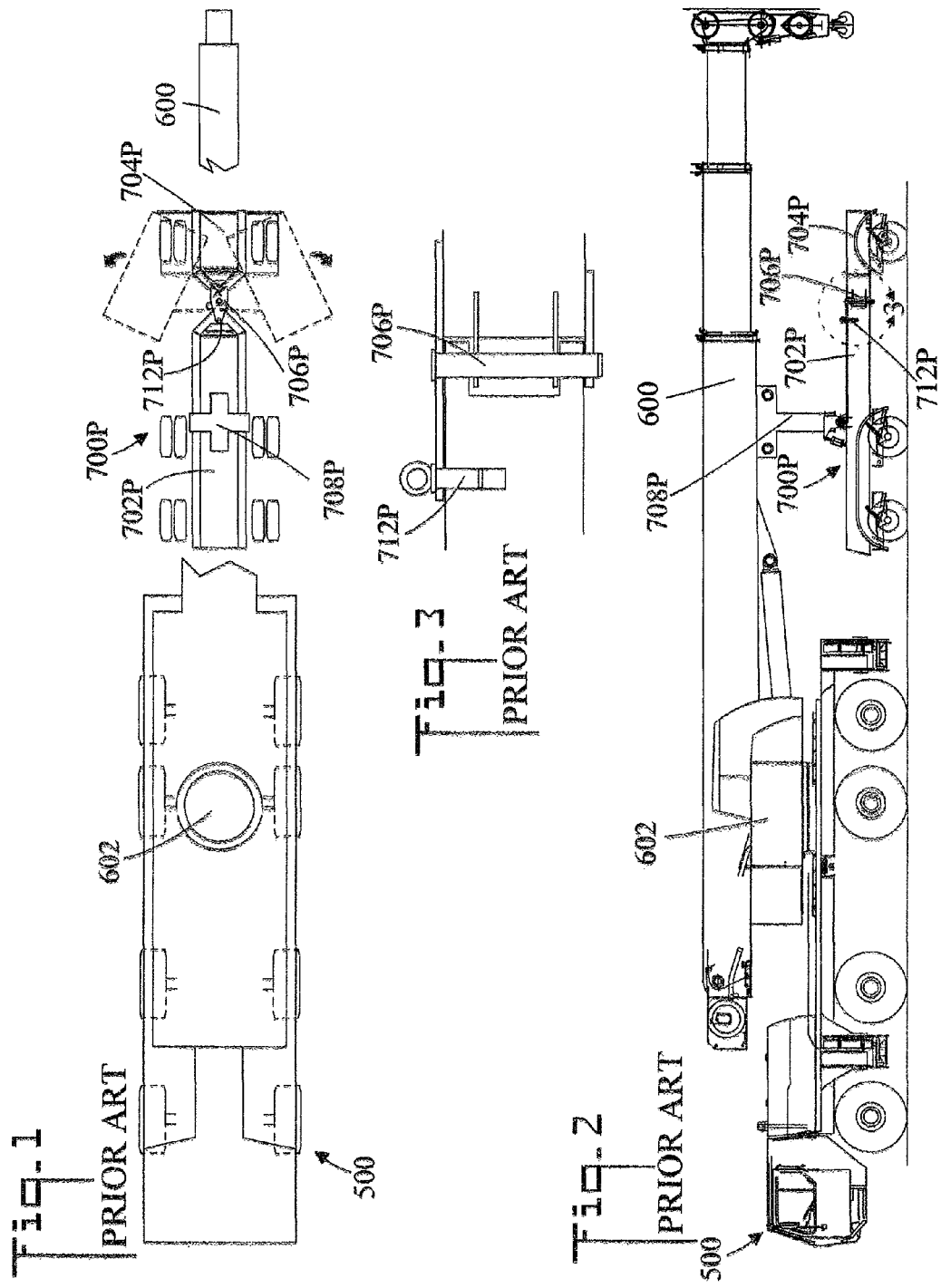

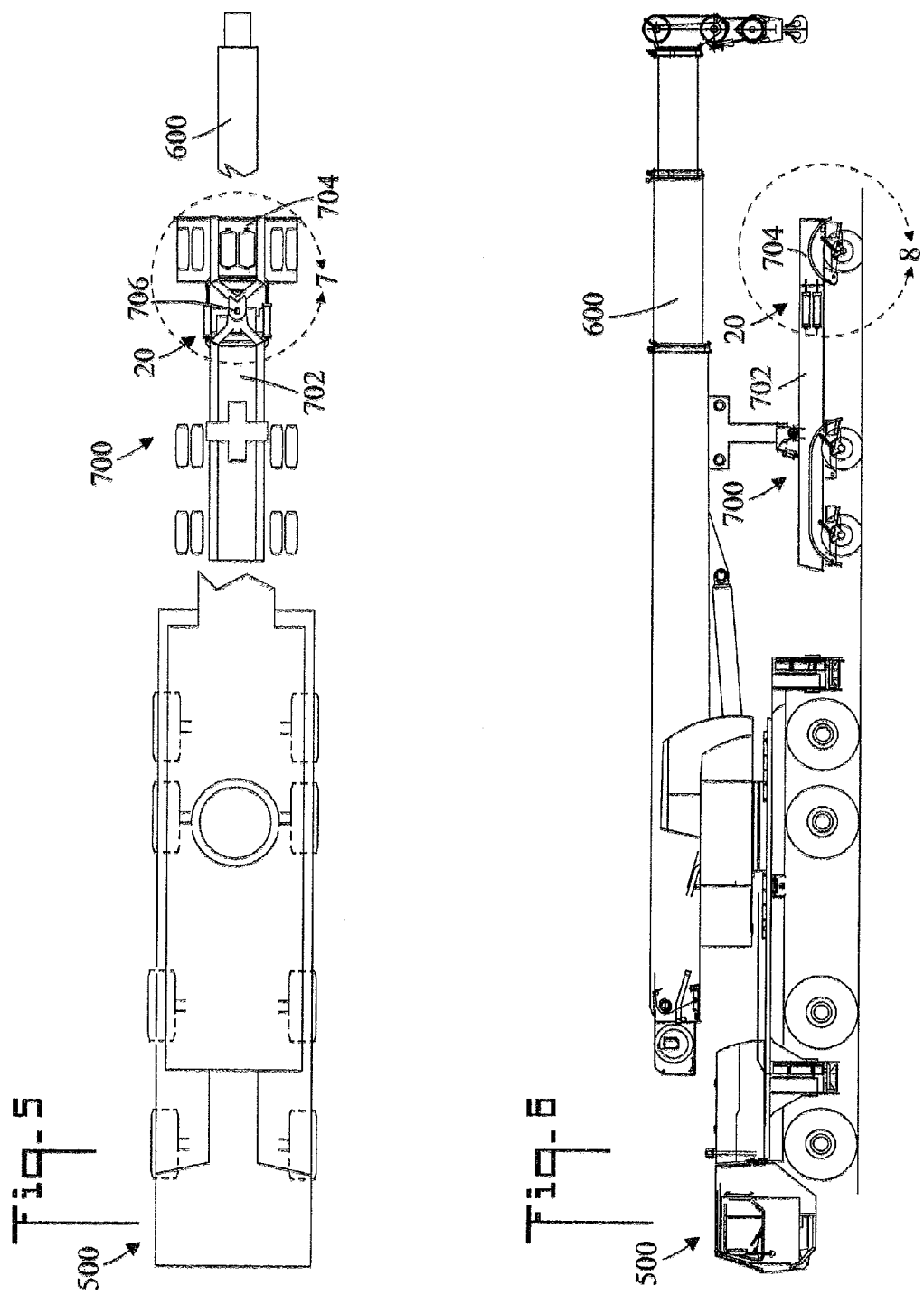

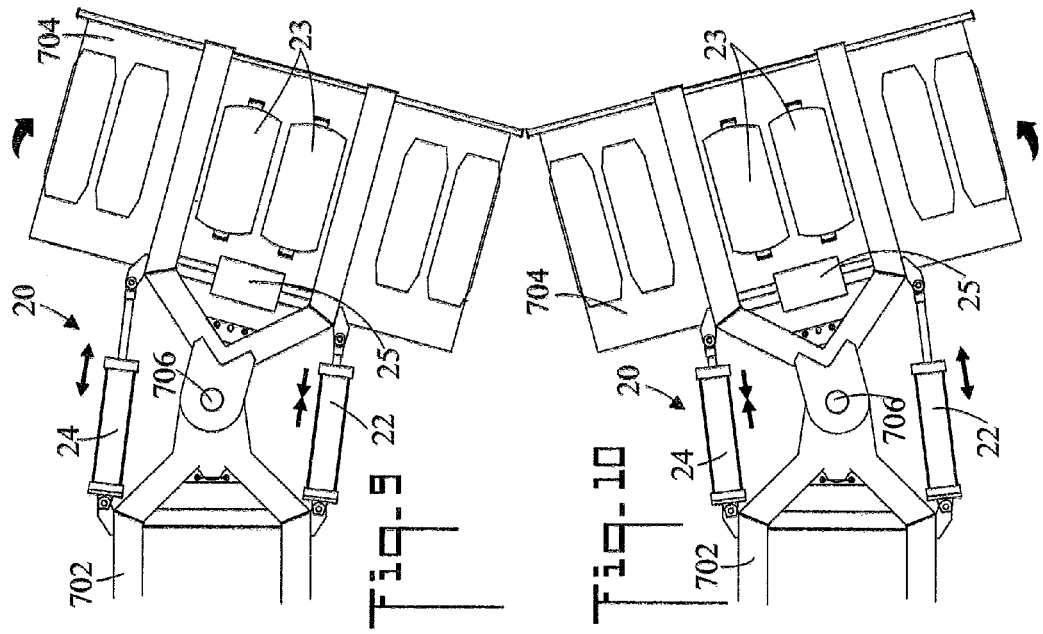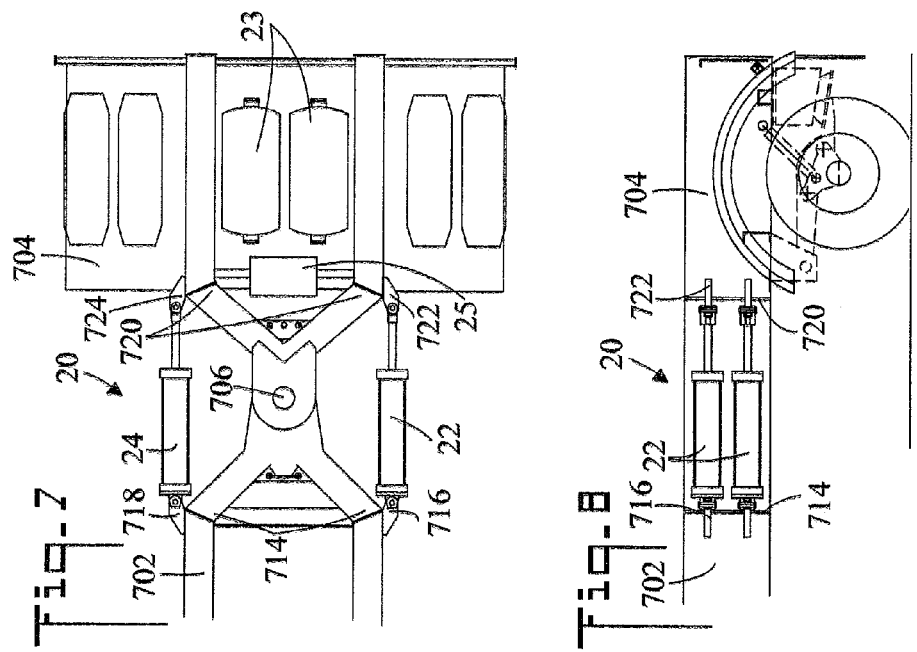

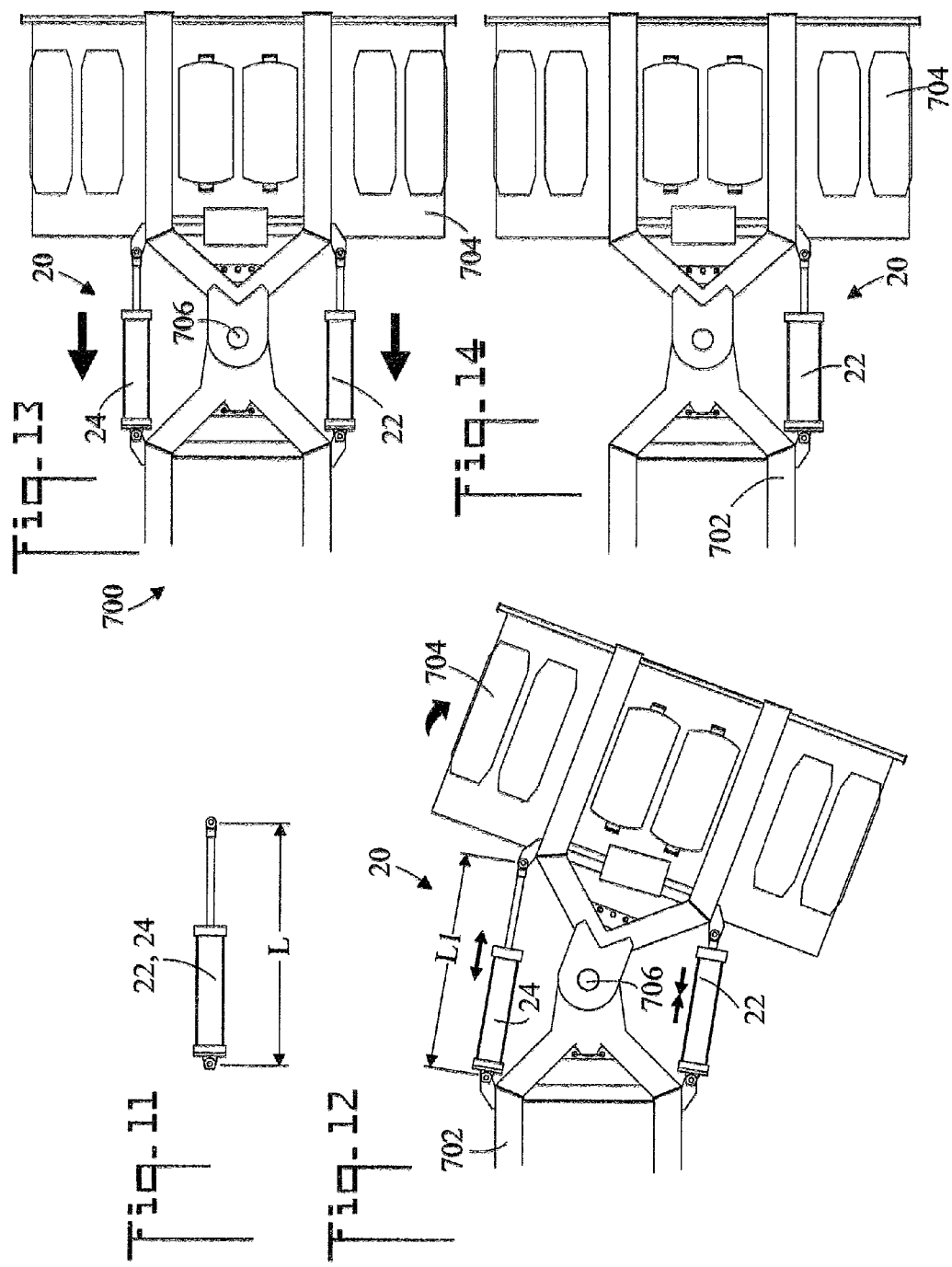

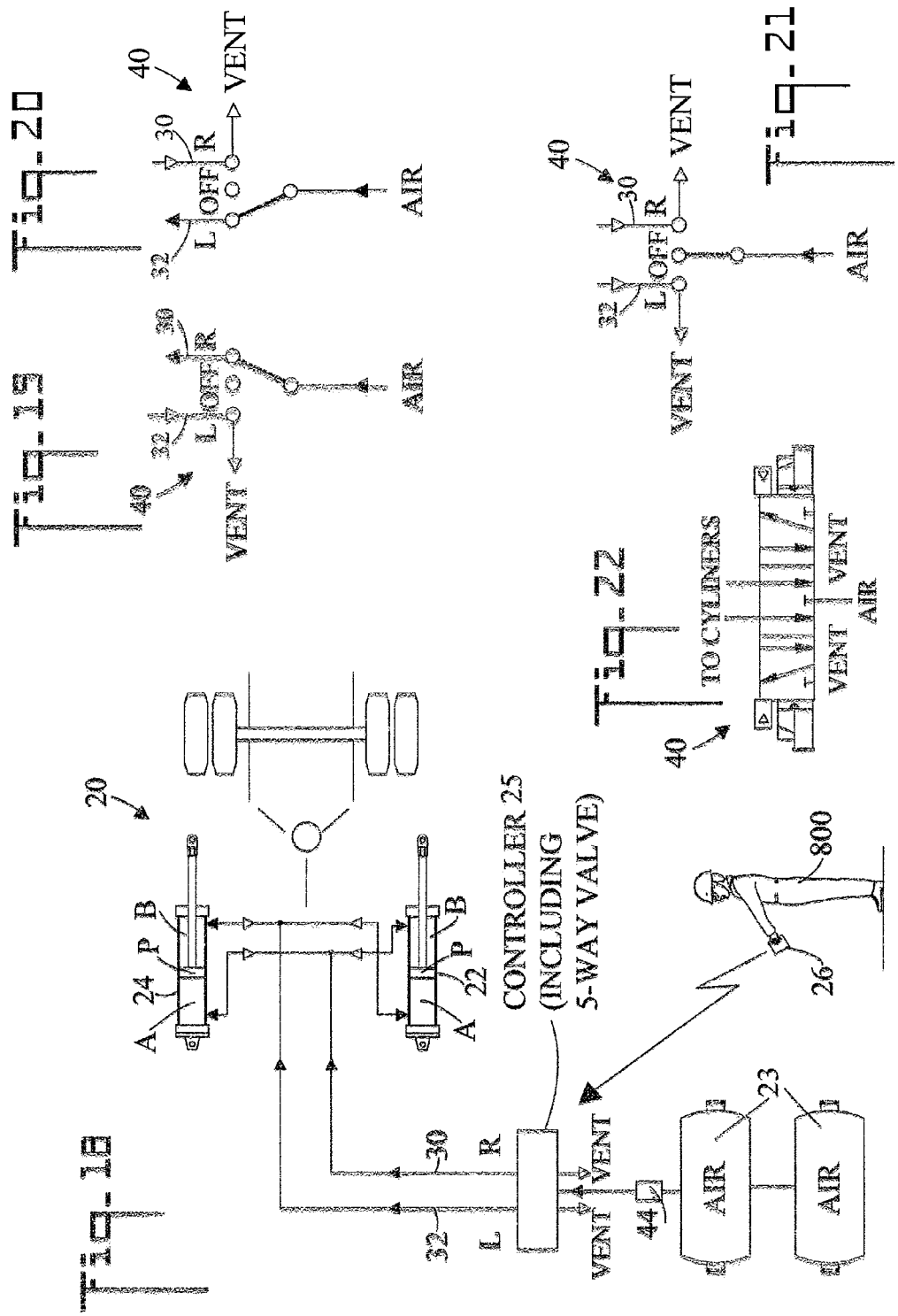

APPARATUS FOR STEERING A BOOM SUPPORT VEHICLE AND METHOD OF USE

CROSS REFERENCE TO RELATED APPLICATION

None

TECHNICAL FIELD

The present invention pertains generally to heavy hauling vehicles which transport elongated loads such as large cranes and which use a boom support vehicle to do so. More particularly the invention pertains to a boom support vehicle which can be selectively steered during either reverse or forward motion.

BACKGROUND OF THE INVENTION

A boom support vehicle is a trailer attached to the boom of a crane for the purpose of supporting a portion of the weight of the boom of the crane when using a crane carrying vehicle to move the crane over roadways. The additional axles provided by the boom support vehicle take some of the crane's heavy weight, thereby lowering the per axle load exerted on the roadway to a level which is within regulatory limits. The boom support vehicle also takes boom-related forces that result from the crane carrier and boom support vehicle going into and coming out of a turn. As cranes have increased in size, boom support vehicles have necessarily been modified to accommodate these larger loads. For example, boom support vehicles have been equipped with hydraulic suspension and better boom-to-vehicle connections to better travel safely on the highway at higher speeds. Typical boom support vehicles include articulated front and rear dollies which have conventional axles. The dolly tower is rigidly connected to the elongated load and pin connected to the top surface of the boom support vehicle by lateral pins to allow the dolly to pivot in a fore and aft direction.

However, when the crane carrying vehicle, crane boom, and boom support vehicle attempt to move in a reverse direction, the articulated boom support vehicle will quickly steer in one direction or the other (i.e. "jack knife"). As such in present designs the boom support vehicle is locked so that it cannot pivot. This however can produce large torsional forces into the boom support vehicle and the boom and also forces that will make the crane carrier, crane, and boom support vehicle steer in unpredictable directions.

BRIEF SUMMARY OF THE INVENTION

The present invention is directed to apparatus for steering a boom support vehicle which avoids the aforementioned problems. To have the ability to steer, control and reverse steer is a great advantage. It allows extensive maneuvering while backing up and moving forward, particularly in confined spaces. In refineries for instance maneuvering space is very limited. Safety is also a critical aspect. With the controlled steering provided by the present apparatus, the operator has directional predictability and safety when reversing and moving forward alike. Moreover, the apparatus limits the torque applied to the system and thereby reduces damage thereto. And, the apparatus provides a safety advantage by preventing personnel from being crushed by a jack knifing boom support vehicle.

Some of the features of the invention are:
A dual method of steering for a multi-rotational steering vehicle
Safe vehicle directional control traveling forward or reverse
Steering control allows forward and reverse maneuvering
Two operator vehicle steering control as required
Radio control steering OFF Highway, and ON Highway at slow speed maneuvering
Radio control operator location allows safe operation. Driver in cab, and radio control steering operator at safe distance from vehicle
Fail safe axle rotation with loss of radio control axle steer will default to axle free caster steer
Steer limit is controlled by steering cylinder retraction to the right or left. Cylinder never gets pulled apart
Radio controlled safety steer has actuation capability during wheel motion only. It will not operate properly with vehicle in stationary condition. (Accidental stationary radio control)
Allows forward and reverse steer to maneuver boom to clear objects during travel
Automatic cylinder air lubrication to allow low friction during cylinder free float high speed highway travel In an embodiment, apparatus for steering a boom support vehicle includes a boom support vehicle which has a front section which is rotatably connected at a pivot to a rear section. The front section has a rear end which has a first side and an opposite second side. The rear section has a front end which has a first side and an opposite second side. A variable length mechanism is connected between the first side of the rear end of the front section and the first side of the front end of the rear section. Changing a length of the variable length mechanism causes the rear section to rotate about the pivot.

In another embodiment, a controller is provided for changing the length of the variable length mechanism.

In Another Embodiment, the Variable Length Mechanism is an Air Cylinder.

In another embodiment, a plurality of variable length mechanisms are connected between the first side of the rear end of the front section and the first side of the front end of the rear section.

In another embodiment, a second variable length mechanism is connected between the second side of the rear end of the front section and the second side of the front end of the rear section.

In another embodiment, the first and second variable length mechanisms each have an inherent fully extended length. When connected between the rear end of the front section and the front end of the rear section and at a maximum rotation of the rear section about the pivot, the variable length mechanism and the second variable length mechanism extend less than the inherent fully extended length.

In another embodiment, the maximum rotation of the rear section is limited by a full retraction of one of the variable length mechanism and the second variable length mechanism.

In another embodiment, a plurality of the variable length mechanisms areconnected between the first side of the rear end of the front section and the first side of the front end of the rear section. And, a plurality of the variable length mechanisms are connected between the second side of the rear end of the front section and the second side of the front end of the rear section.

Other embodiments, in addition to the embodiments enumerated above, will become apparent from the following detailed description, taken in conjunction with the accompanying drawings, which illustrate, by way of example, the principles of the apparatus and method of use.

BRIEF DESCRIPTION OF THE DRAWINGS

FIG. 1 is a fragmented top plan view of a prior art crane carrying vehicle, a crane boom, and a boom support vehicle;

FIG. 2 is a side elevation view of the prior art crane carrying vehicle, crane boom, and boom support vehicle;

FIG. 3 is an enlarged view of area 3 of FIG. 2;

FIG. 5 is a fragmented top plan view of the crane carrying vehicle, the crane boom, and apparatus for steering the boom support vehicle;

FIG. 6 is a side elevation view of the crane carrying vehicle, the crane boom, and the apparatus for steering the boom support vehicle;

FIG. 7 is an enlarged view of area 7 of FIG. 5;

FIG. 8 is an enlarged view of area 8 of FIG. 6;

FIG. 9 is an enlarged view as in FIG. 7 with a rear section of the boom support vehicle being steered in one direction;

FIG. 10 is an enlarged view as in FIG. 7 with the rear section of the boom support vehicle being steered in the opposite direction;

FIG. 11 is an enlarged top plan view of a variable length mechanism at an inherent fully extended length;

FIG. 12 is an enlarged view as in FIG. 7 with the rear section of the boom support vehicle a maximum angular rotation;

FIG. 13 is an enlarged view as in FIG. 7 with the boom support vehicle moving forward;

FIG. 14 is an enlarged view as in FIG. 7 with a variable length mechanism installed on only one side of the boom support vehicle;

FIG. 18 is a steering diagram;

FIG. 19 is a diagram showing steering right;

FIG. 20 is a diagram showing steering left;

FIG. 21 is a diagram showing no steering; and,

FIG. 22 is a pneumatic diagram of a 5-way air valve.

DETAILED DESCRIPTION OF THE INVENTION

Referring initially to FIGS. 1-4, there are illustrated top plan, side elevation, enlarged side elevation, and reverse moving views of a prior art crane carrying vehicle 500 which carries a crane boom 600, and a boom support vehicle 700P which supports crane boom 600. Boom support vehicle 700P includes a two axle front section (dolly) 702P which is rotatably connected to a one axle rear section (dolly) 704P at a pivot 706P. Front section 702P is connected to crane boom 600 via a boom support vehicle tower 708P in the conventional rigid manner which allows for fore and aft pitching of crane boom 600 (such as when going over a bump in the road). Crane boom 600 is rotatably connected to crane carrying vehicle 500 by a turntable bearing 602 which allows crane boon 600 to freely rotate with respect to crane carrying vehicle 500. Turntable bearing 602 must always be free to rotate or damage will occur to the system. While in the shown embodiment boom support vehicle 700P supports crane boom 600, it may be appreciated that boom support vehicle 700P could also be used to support other elongated loads.

In FIG. 1, it is noted that if crane carrying vehicle 500, crane boom 600, and boom support vehicle 700P are moved in a reverse (i.e. backed-up) (also refer to FIG. 4), because of pivot 706P, rear section 704P will immediately rotate in one direction or the other about pivot 706P ("jack knife") as is indicated by the broken positions. When this happens, the moving in reverse must immediately stop since the crane carrying vehicle driver has lost all possible chance to control direction of the reverse motion. To avoid this situation, a locking pin 712P is inserted into both front section 702P and rear section 704P. Locking pin 712P holds front section 702P and rear section 704P together and prevents rear section 704P from rotating about pivot 706P. As such, rear section cannot "jack knife" during reverse motion.

Figure 4:
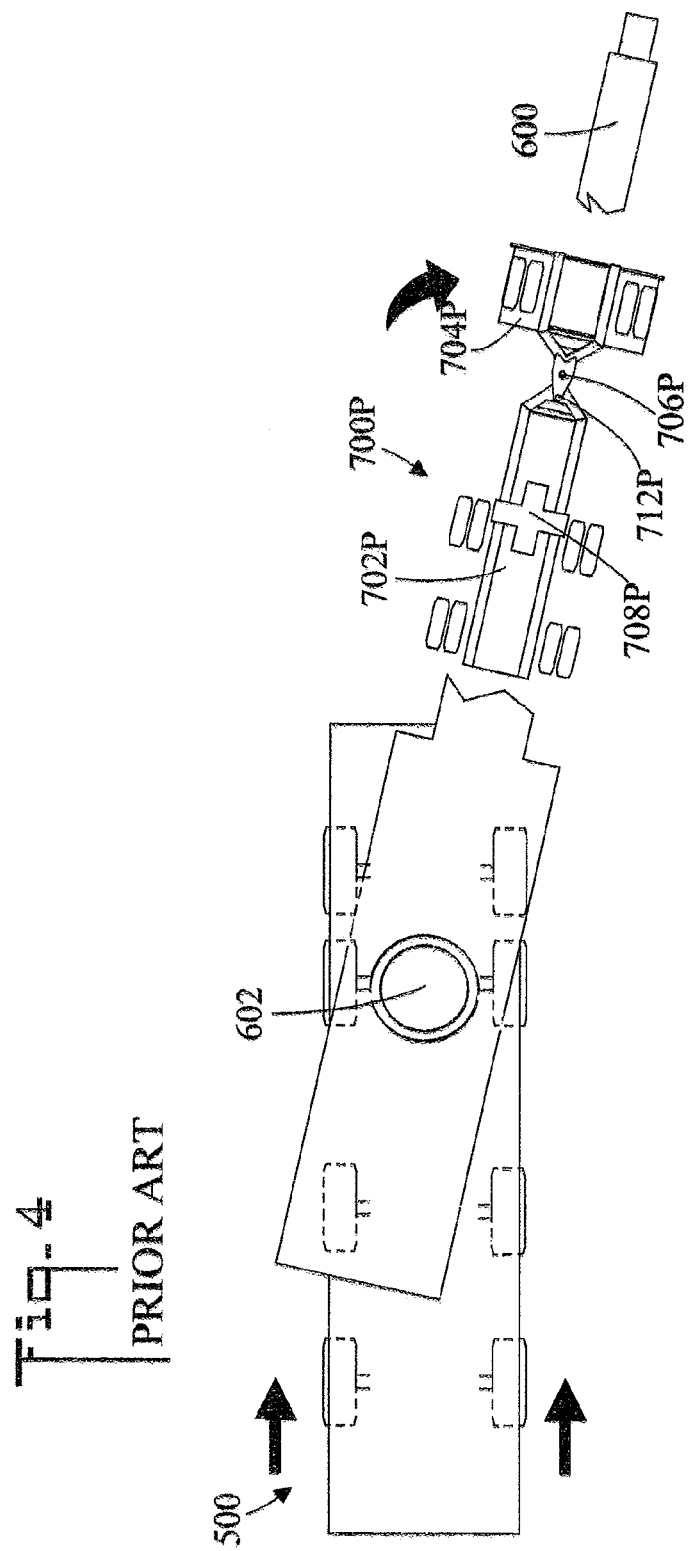
FIG. 4 is a top plan view of the prior art crane carrying vehicle, the crane boom, and the boom support vehicle moving in a reverse direction.

However, even with locking pin 712P installed, controlled reverse motion is still not possible. As is shown in FIG. 4, even with locking pin 712P installed, when moving in reverse boom support vehicle 700P will still move right or left about turntable bearing 602. Any side slope or unevenness on the roadway will direct boom support vehicle 700P away from a controlled reverse by the crane carrying vehicle truck driver. As such, on existing units reversing constitutes a very limited control situation, and as such the driver will only reverse when no other choice is available. For example, if possible drivers will only park in areas which do not require reversing. The parking areas must be large and can be difficult to find.

Now referring to FIGS. 5-6 there are illustrated fragmented top plan and side elevation views respectively of the crane carrying vehicle 500, the crane boom 600, and apparatus 20 for steering boom support vehicle 700. FIG. 7 is an enlarged view of area 7 of FIG. 5. FIG. 8 is an enlarged view of area 8 of FIG. 6. FIG. 9 is an enlarged view as in FIG. 7 with rear section 704 of boom support vehicle 700 being steered in one direction, and FIG. 10 is an enlarged view as in FIG. 7 with rear section 704 of boom support vehicle 700 being steered in the opposite direction. In apparatus 20, boom support vehicle 700 has a front section 702 which is rotatably connected at a pivot 706 to a rear section 704. Front section 702 has a rear end 714 (the end closest to rear section 704). Rear end 714 has a first side 716 and an opposite second side 718. In the shown embodiment, first side 716 is on the left (port) side of rear end 714, and second side 718 is on the right (starboard) side of rear end 714. Similarly, rear section 704 has a front end 720 having a first side 722 and an opposite second side 724. In the shown embodiment, first side 722 is on the left (port) side of front end 720, and second side 724 is on the right (starboard) side of front end 720.

A variable length mechanism 22 is connected between first side 716 of rear end 714 of front section 702 and first side 722 of front end 720 of rear section 704. Changing a length of said variable length mechanism 22 causes rear section 704 to rotate about pivot 706 (i.e. steer) with respect to front section 702.

Variable length mechanism 22 is a device which when activated either extends or retracts under operator control. In an embodiment, variable length mechanism 22 is an air cylinder which receives compressed air from compressed air tanks 23 via a remotely operated controller 25 (plumbing not shown) (refer also to FIG. 18 and the associated discussion). However it may be appreciated that hydraulic or even electrical units could also be employed as variable length mechanism 22. In the shown embodiment, variable length mechanism 22 is bi-directional, meaning that it is both forced to extend and forced to retract.

In the shown embodiment, a plurality (two) of variable length mechanisms 22 are connected between first side 716 of rear end 714 of front section 702 and first side 722 of front end 720 of rear section 704. If air cylinders are utilized, multiple variable length mechanism 22 are useful because of the compressibility of air. The number, size, and extension/retraction force exerted by variable length mechanism 22 are determined by the specific application.

In another embodiment, a second variable length mechanism 24 is connected between second side 718 of rear end 714 of front section 702 and second side 724 of front end 720 of rear section 704. In this embodiment, variable length mechanisms 22 and 24 work in unison. One variable length mechanism extends and the other variable length mechanism retracts to effect the rotation of rear section 704 about pivot 706. For example in FIG. 9, variable length mechanism 22 retracts and variable length mechanism 24 simultaneously extends. In FIG. 10 the directions are reversed from those of FIG. 9.

Similar to the connection of a plurality of variable length mechanisms 22 to first sides 716 and 722, it may be appreciated that a plurality of variable length mechanisms 24 could be similarly connected between second side 718 of rear end 714 of front section 702 and second side 724 of front end 720 of rear section 704. While not specifically shown, this connection would be the mirror image of FIG. 8 for the right side of the boom support vehicle 700. It is further noted that the variable length mechanism(s) provide a safety feature by preventing a person from being crushed by a jack knifing rear section 704.

FIG. 11 is an enlarged top plan view of variable length mechanism 22 (and second variable length mechanism 24) at an inherent fully extended length L, and FIG. 12 is an enlarged view as in FIG. 7 with rear section of boom support vehicle 700 a maximum angular rotation. The inherent fully extended length L is the maximum length to which unconnected variable length mechanisms 22 and 24 can be extended without pulling apart. Apparatus 20 is designed such that when variable length mechanisms 22 and 24 are connected between rear end 714 of front section 704 and front end 720 of rear section 704, at a maximum rotation of rear section 704 about pivot 706, variable length mechanism 22 and second variable length mechanism 24 will extend a length L1 which is less than inherent fully extended length L. This design ensures that variable length mechanisms 22 and 24 will not be "pulled apart" by rotating rear section 704. It is noted that at maximum rotation of rear section 704, the opposite variable length mechanism (22 in the shown instance) is fully retracted (bottomed out) thereby preventing further rotation. This means that the housing of the opposite variable length mechanism 22 effectively serves as a stop to prevent further rotation. In other words, the maximum rotation of rear section 704 is limited by a full retraction of one of variable length mechanism 22 and second 24 variable length mechanism 24.

FIG. 13 is an enlarged view as in FIG. 7 with the front 702 and rear 704 of boom support vehicle 700 moving forward (such as on a highway). In this situation, variable length mechanisms 22 and 24 are deactivated, and are free to move in or out (extend or retract) so as not to affect the normal rotation of rear section 704 about pivot 706.

FIG. 14 is an enlarged view as in FIG. 7 with a variable length mechanism 22 installed on only one side of the front 702 and rear 704 sections of boom support vehicle 700. In the embodiment depicted in FIGS. 4-13, variable length mechanisms 22 and 24 were installed on opposites sides of the front 702 and rear 704 sections. This arrangement provides a push-pull effect to steer rear section 704. In the embodiment of FIG. 14 the variable length mechanism(s) is only installed on one side of the front 702 and rear 704 sections. As such the variable length mechanism(s) should be larger and exert a greater extending and retracting force between front section 702 and rear section 704. As stated before, the exact size, number, and extension/retraction force are determined by specific system requirements. However, it may be appreciated that if a variable length mechanism is used on only one side, there could be a problem with pulling the mechanism apart during large rotations of rear section 704 (refer to the discussion of FIGS. 11 and 12 above).

Figure 15:
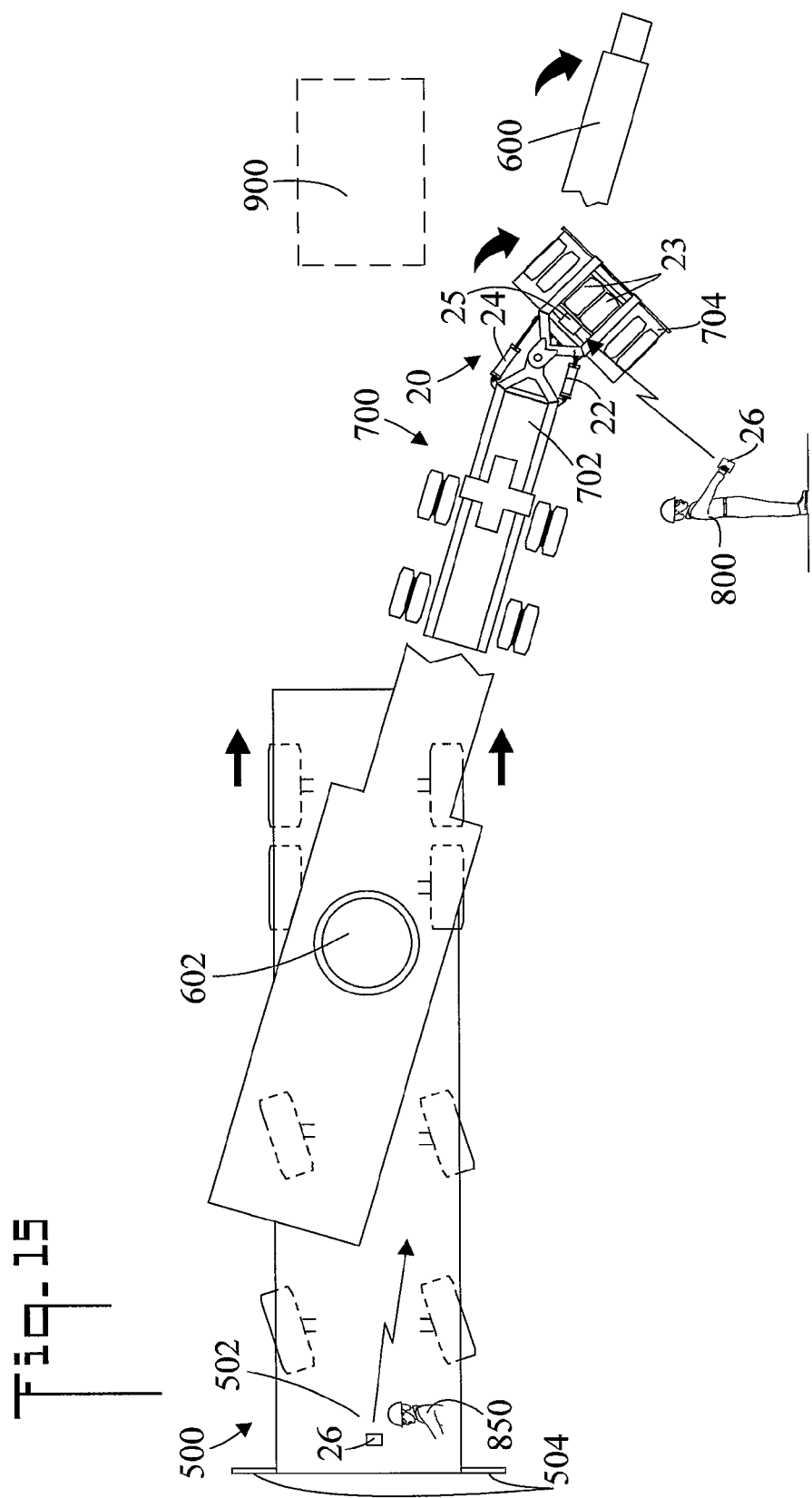
FIG. 15 is a top plan view of the apparatus steering the boom support vehicle with the crane carrying vehicle, the crane boom, and the boom support vehicle moving in a reverse direction.

FIG. 15 is a top plan view of apparatus 20 steering boom support vehicle 700 with crane carrying vehicle 500, crane boom 600, and boom support vehicle 700 moving in a reverse direction. To be effective, the boom support vehicle 700 must be moving, even at a low speed, so that the steering can take effect. A boom support vehicle operator 800 uses a remote control 26 to send extension/retraction orders to controller 25, which in turn causes compressed air from tanks 23 to be sent to air cylinders 22 and 24, thereby causing extension/retraction.

Figure 16:
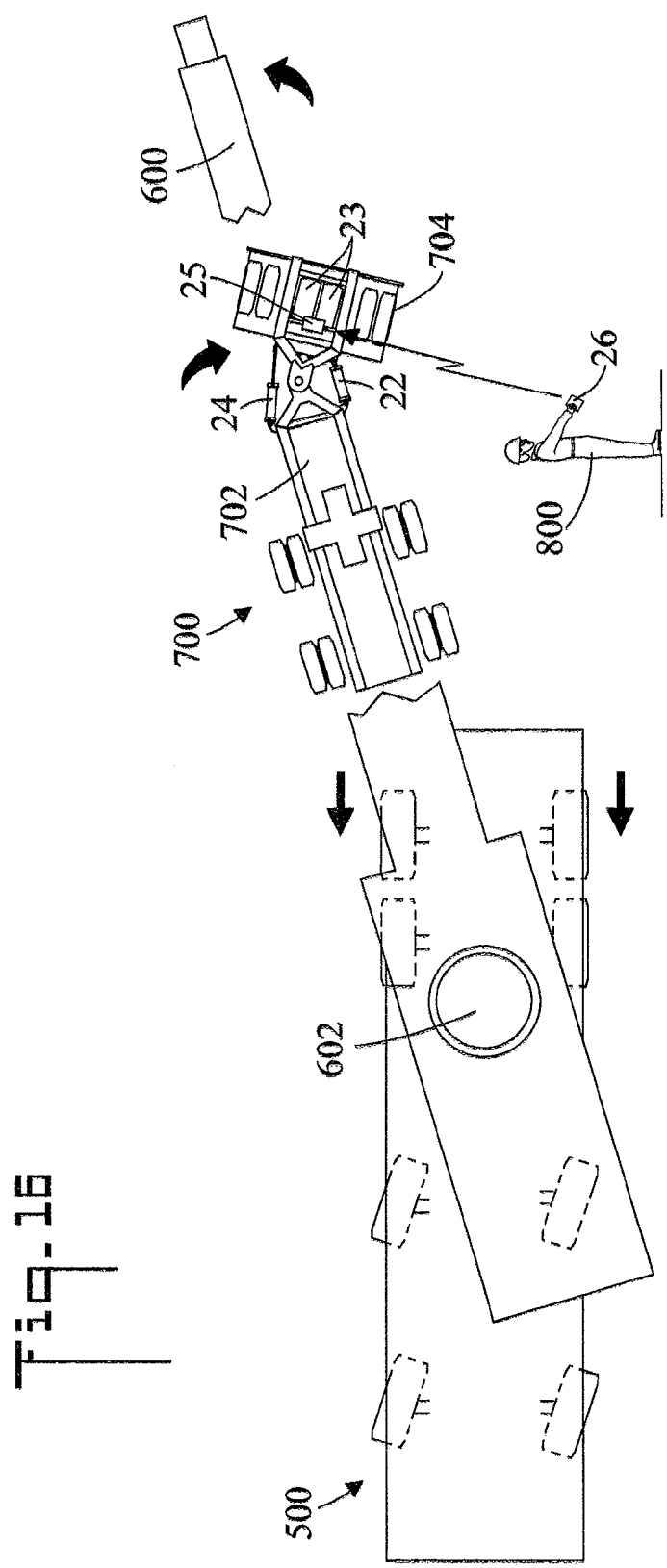
FIG. 16 is a top plan view of the apparatus steering the boom support vehicle with the crane carrying vehicle, the crane boom, and the boom support vehicle moving in a forward direction.

Apparatus 20 provides directional steering control and maneuvering of boom support vehicle 700, and therefore also crane boom 600, while moving in reverse (FIG. 15), and moving forward (FIG. 16). The apparatus 20 permits coordinated steering operation between the boom support vehicle operator 800 and the driver of the crane carrying vehicle 500. For example, if an obstacle 900 is disposed in the vicinity of boom support vehicle 700, apparatus 20 allows boom support vehicle 700 to be maneuvered around obstacle 900 in either forward or reverse directions. Moreover, for safety purposes, it is noted that the boon support vehicle operator 800 is positioned a safe distance away from the crane carrying vehicle 500, crane boom 600, and the boom support vehicle 700. Apparatus 20 can be used on or off highway, eg in a parking area or on a highway to back out of an accident or other road block. It is further noted that the steering of boom support vehicle 700 results in crane boom 600 rotating about turntable bearing 602. This reduces any torque applied to the system which might be caused by the steering of boom support vehicle 700.

FIG. 15 also shows another embodiment of the apparatus and system. In this embodiment remote control 26 is located in the cab 502 of crane carrying vehicle 500 and is operated by the driver 850 of crane carrying vehicle, as opposed to being located external to crane carrying vehicle 500 and operated by boom support vehicle operator 800. Driver 850 uses the side mirrors 504 of crane carrying vehicle 500 to view the positions of crane carrying vehicle 500, the crane 600, and boom support vehicle 700. As such, driver 850 is in complete control of the steering operation. This embodiment also permits a single person to effect steering of boom support vehicle 700.

FIG. 16 is a top plan view of apparatus 20 steering boom support vehicle 700 with the crane carrying vehicle 500, the crane boom 600, and the boom support vehicle 700 moving in a forward direction. Operation is similar to that of reverse steering, wherein boom support vehicle operator 800 uses remote control 26 to send extension/retraction orders to controller 25, which in turn causes compressed air from tanks 23 to be sent to air cylinders 22 and 24, thereby causing extension/retraction.

Figure 17:
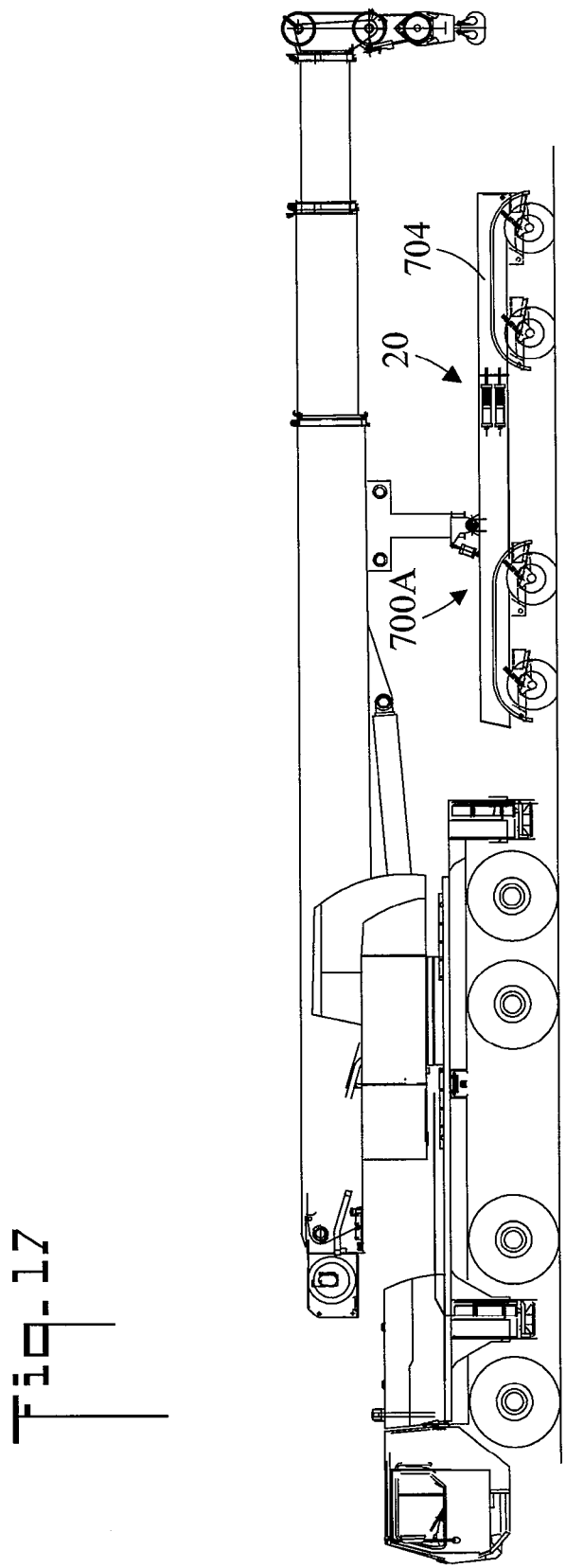
FIG. 17 is a side elevation view of the apparatus installed on a different boom support vehicle.

FIG. 17 is a side elevation view of apparatus 20 installed on a different boom support vehicle 700A. The only difference is that the rear section 704 of boom support vehicle 700A has two axles rather than the single axle of FIG. 6.

FIG. 18 is a steering diagram. In the shown embodiment, variable length mechanisms 22 and 24 are air cylinders. Boom support vehicle operator 800 controls steering with remote control 26 transmitter. Air cylinders 22 and 24 each have a first chamber A and a second chamber B separated by a piston P. Remote control 26 has three positions: steer right R, steer left L, and OFF. When operator 800 actuates remote control 26 it sends a signal to controller 25. Controller includes a 5-way air valve 40 (also refer to FIGS. 19-22), a radio control receiver, and the necessary electronics to control the 5-way air valve 40. The signal from remote control 26 causes the 5-way valve to (1) route air to steer right R along pneumatic line 30 to first chamber A of air cylinder 22 and to second chamber B of air cylinder 24 (black arrows on line 32), (2) route air to steer left L along pneumatic line 32 to second chamber B of air cylinder 22 and to first chamber A of air cylinder 24 (black arrows on line 30), or (3) route no air to the air cylinders and allow the first A and second B chambers of both air cylinders to vent to the atmosphere through lines 30 and 32 to the 5-way air valve 40 (white arrows). In an embodiment remote control 26 is a three position toggle switch: namely center position (no steer OFF) and toggle left to steer left L and toggle right to steer right R. In this fashion, air cylinders 22 and 24 operate in a manner where one is pushing and the other is pulling to effect the steering. In an embodiment, the toggle switch is spring loaded to the OFF position. In the shown embodiment, steering right R rotates rear section 704 clockwise as is shown in FIG. 9, and steering left L rotates rear section 704 counterclockwise as is shown in FIG. 10.

An air lubricator 44 is used to add oil lubricant to the compressed air, which is transferred to the air cylinders 22 and 24. Cylinder resistance must to be kept to a minimum such that cylinders move freely when the vehicle travels at highway speeds. If the cylinders offer resistance, then the rear section 704 cannot come out of a turn quickly enough for safety.

FIG. 19 is a diagram showing steering right R. Also referring to FIG. 18, 5-way air valve 40 is configured so that compressed air is routed through pneumatic line 30 to both first chamber A of air cylinder 22 and to the second chamber B of air cylinder 24. This provides the push-pull steering action. Simultaneously second chamber B of air cylinder 22 and first chamber A of air cylinder 24 are vented to the atmosphere through pneumatic line 32 and 5-way valve 40.

FIG. 20 is a diagram showing steering left L. Also referring to FIG. 18, 5-way air valve is configured so that compressed air is routed through pneumatic line 32 to second chamber B of air cylinder 22 and to the first chamber A of air cylinder 24. Simultaneously first chamber A of air cylinder 22 and second chamber B of air cylinder 24 are vented to the atmosphere through pneumatic line 30 and 5-way valve 40.

FIG. 21 is a diagram showing no steering. Also referring to FIG. 18, 5-way valve 40 is configured so that no air is supplied to either air cylinder 22 or 24, and that both air cylinders are vented to the atmosphere through pneumatic lines 30 and 32. This allows the cylinders to freely extend and retract as rear section 704 rotates about pivot 706 (refer to FIGS. 9 and 10). As the boon support vehicle 700 travels on a roadway it is very important that the rear section 704 can freely rotate about pivot 706, particularly when going into and coming out of turns. To ensure that this happens, chambers A and B of both air cylinders are vented to the atmosphere through pneumatic lines 30 and 32 at 5-way valve 40. Put another way, variable length mechanism 22 is an air cylinder which has a first chamber A separated from a second chamber B by a piston P. When controller 25 is not activated, first A and second B chambers of air cylinder 22 vent to the atmosphere. If and opposite air cylinder 24 is provided, similar venting occurs. The venting will occur if controller 25 is in the OFF position, or if system power is lost.

FIG. 22 is a pneumatic diagram of 5-way air valve 40.

It may be appreciated that apparatus 20 may be combined with crane carrying vehicle 500, and crane boom 600 which is rotatably connected to crane carrying vehicle 500 by a turntable bearing 602, to form a system for steering a boom support vehicle 700.

In terms of use, a method for steering a boom support vehicle 700 includes: (refer to FIGS. 1-22)

(a) providing a crane carrying vehicle 500;

(b) providing a crane boom 600 rotatably connected to the crane carrying vehicle 500 by a turntable bearing 602;

(c) providing apparatus 20 for steering a boom support vehicle 700, the apparatus 20 including;

a boom support vehicle 700 connected to and supporting the crane boom 600, the boom support vehicle 700 including a front section 702 which is rotatably connected at a pivot 706 to a rear section 704, the front section 702 having a rear end 714, the rear end 714 having a first side 716 and an opposite second side 718, the rear section 704 having a front end 720, the front end having a first side 722 and an opposite second side 724, a variable length mechanism 22 connected between the first side 716 of the rear end 714 of the front section 702 and the first side 722 of the front end 720 of the rear section 704;

changing a length of the variable length mechanism 22 causing the rear section 704 to rotate about the pivot 706;

(d) providing a controller 25 for changing the length of the variable length mechanism 22;

(e) causing the crane carrying vehicle 500 to move;

(f) activating the controller 25 and using the controller 25 to steer the rear section 702 of the boom support vehicle 700 in a desired direction; and, (g) the steering of (f) causing the crane boom 600 to rotate about the turntable bearing 602.

The method further including, an obstacle 900 disposed in the vicinity of the boom support vehicle 700, and, in (f) using the controller 25 to maneuver the boom support vehicle 700 around the obstacle 900.

The method further including:

in (c), a second variable length mechanism 24 connected between the second side 718 of the rear end 714 of the front section 702 and the second side 724 of the front end 720 of the rear section 702;

in (c), the variable length mechanism 22 and second variable length mechanism 24 each having an inherent fully extended length L; and, in (f), at a maximum rotation of the rear section 704 about the pivot 706 the variable length mechanism 22 and second variable length mechanism 24 extending a length L1 which is less than the inherent fully extended length L.

The method further including:

in (c) the variable length mechanism 22 being an air cylinder having a first chamber A separated from a second chamber B by a piston P; and, when controller 25 is not activated, first A and second B chambers of air cylinder 22 both venting to the atmosphere.

The method further including:
  in (a), crane carrying vehicle 500 having a cab 502; and,
  providing a remote control 26 for remotely controlling controller 25 in (f), remote control 26 located (1) external to crane carrying vehicle 500, or (2) in cab 502 of crane carrying vehicle 500.

The embodiments of the apparatus and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus and method should be construed as limiting the invention to a particular embodiment or combination of embodiments. The scope of the invention is defined by the appended claims.

We claim:

1. Apparatus for steering a boom support vehicle, comprising:
  a boom support vehicle having a front section which is rotatably connected at a pivot to a rear section;
  said front section having a rear end, said rear end having a first side and an opposite second side;
  said rear section having a front end, said front end having a first side and an opposite second side;
  a variable length mechanism connected between said first side of said rear end of said front section and said first side of said front end of said rear section;
  changing a length of said variable length mechanism causing said rear section to rotate about said pivot;
  said variable length mechanism being an air cylinder having a first chamber separated from a second chamber by a piston;
  a controller for changing said length of said variable length mechanism; and,
  when said controller is not activated, said first and second chambers of said air cylinder both venting to the atmosphere.

2. A system for steering a boom support vehicle, comprising:
  a crane carrying vehicle;
  a crane boom rotatably connected to said crane carrying vehicle by a turntable bearing;
  a boom support vehicle connected to and supporting said crane boom;
  apparatus for steering said boom support vehicle, said apparatus including;
    said boom support vehicle including a front section which is rotatably connected at a pivot to a rear section, said front section having a rear end, said rear end having a first side and an opposite second side, said rear section having a front end, said front end having a first side and an opposite second side;
    a variable length mechanism connected between said first side of said rear end of said front section and said first side of said front end of said rear section;
    changing a length of said variable length mechanism causing said rear section to rotate about said pivot;
  a controller for changing said length of said variable length mechanism, said change of length causing said rear section to rotate about said pivot and steer said boom support vehicle; and,
  said steering of said boom support vehicle causing said crane boom to rotate about said turntable bearing.

3. The system according to claim 2, further including:
  said variable length mechanism being an air cylinder.

4. The system according to claim 2, further including:
  a plurality of said variable length mechanisms connected between said first side of said rear end of said front section and said first side of said front end of said rear section.

5. The system according to claim 2, further including:
  a second variable length mechanism connected between said second side of said rear end of said front section and said second side of said front end of said rear section.

6. The system according to claim 5, further including:
  said first and second variable length mechanisms each having an inherent fully extended length;
  when connected between said rear end of said front section and said front end of said rear section and at a maximum rotation of said rear section about said pivot, said first and second variable length mechanisms extending less than said inherent fully extended length; and,
  said maximum rotation of said rear section limited by a full retraction of one of said first and second variable length mechanisms.

7. The system according to claim 2, further including:
  a plurality of said variable length mechanisms connected between said first side of said rear end of said front section and said first side of said front end of said rear section, and,
  a plurality of said variable length mechanisms connected between said second side of said rear end of said front section and said second side of said front end of said rear section.

8. The system according to claim 2, further including:
  said variable length mechanism being an air cylinder having a first chamber separated from a second chamber by a piston;
  a controller for changing said length of said variable length mechanism; and,
  when said controller is not activated, said first and second chambers of said air cylinder both venting to the atmosphere.

9. The system according to claim 2, the system further including:
  said crane carrying vehicle having a cab;
  a remote control for remotely controlling said controller; and,
  said remote control located (1) external to said crane carrying vehicle, or (2) in said cab of said crane carrying vehicle.

10. A method for steering a boom support vehicle, comprising:
  (a) providing a crane carrying vehicle;
  (b) providing a crane boom rotatably connected to said crane carrying vehicle by a turntable bearing;
  (c) providing a boom support vehicle connected to and supporting said crane boom;
  (d) providing apparatus for steering a said boom support vehicle, said apparatus including:
    said boom support vehicle including, a front section which is rotatably connected at a pivot to a rear section, said front section having a rear end, said rear end having a first side and an opposite second side, said rear section having a front end, said front end having a first side and an opposite second side;
    a variable length mechanism connected between said first side of said rear end of said front section and said first side of said front end of said rear section;
    changing a length of said variable length mechanism causing said rear section to rotate about said pivot;

(e) providing a controller for changing said length of said variable length mechanism;

(f) causing said crane carrying vehicle to move;

(g) activating said controller and using said controller to steer said rear section of said boom support vehicle in a desired direction; and, (h) said steering of (g) causing said crane boom to rotate about said turntable bearing.

11. The method of claim 10, an obstacle disposed in the vicinity of the boom support vehicle, the method further including:

in (g) using said controller to maneuver said boom support vehicle around the obstacle.

12. The method of claim 10, further including:

in (d), a second variable length mechanism connected between said second side of said rear end of said front section and said second side of said front end of said rear section;

in (d), said first and second variable length mechanisms each having an inherent fully extended length; and, in (g), at a maximum rotation of said rear section about said pivot said first and second variable length mechanisms extending less than said inherent fully extended length.

13. The method of 10, further including:

in (d) said variable length mechanism being an air cylinder having a first chamber separated from a second chamber by a piston; and, when said controller is not activated, said first and second chambers of said air cylinder both venting to the atmosphere.

14. The method of claim 10, further including:

in (a), said crane carrying vehicle having a cab; and, providing a remote control for remotely controlling said controller in (g), said remote control located (1) external to said crane carrying vehicle, or (2) in said cab of said crane carrying vehicle.

\* \* \* \* \*